US011827517B2

(12) United States Patent
Potin et al.

(10) Patent No.: US 11,827,517 B2
(45) Date of Patent: Nov. 28, 2023

(54) METHOD FOR RECYCLING CARBONACEOUS BY-PRODUCTS

(71) Applicant: SAFRAN CERAMICS, Le Haillan (FR)

(72) Inventors: Jean-François Daniel René Potin, Moissy-Cramayel (FR); Laurent Maisse, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/006,700

(22) PCT Filed: Jul. 20, 2021

(86) PCT No.: PCT/FR2021/051354
§ 371 (c)(1),
(2) Date: Jan. 24, 2023

(87) PCT Pub. No.: WO2022/023642
PCT Pub. Date: Feb. 3, 2022

(65) Prior Publication Data
US 2023/0286803 A1  Sep. 14, 2023

(30) Foreign Application Priority Data
Jul. 30, 2020 (FR) ..................... 2008126

(51) Int. Cl.
C04B 35/83 (2006.01)
C01B 32/05 (2017.01)
C04B 35/622 (2006.01)

(52) U.S. Cl.
CPC ........ *C01B 32/05* (2017.08); *C04B 35/62204* (2013.01); *C04B 35/83* (2013.01); *C04B 2235/614* (2013.01)

(58) Field of Classification Search
CPC ...................................... C04B 35/83
See application file for complete search history.

(56) References Cited

U.S. PATENT DOCUMENTS

| 5,550,312 A | 8/1996 | Schingnitz et al. |
| 10,000,385 B2 * | 6/2018 | Jacob ............... H01M 4/0471 |

FOREIGN PATENT DOCUMENTS

| EP | 0 835 853 A1 | 4/1998 |
| WO | WO 95/11867 A1 | 5/1995 |
| WO | WO 2020/120857 A1 | 6/2020 |

OTHER PUBLICATIONS

Written Opinion of the International Searching Authority as issued in International Patent Application No. PCT/FR2021/051354, dated Nov. 11, 2021.
International Search Report as issued in International Patent Application No. PCT/FR2021/051354, dated Nov. 11, 2021.
McAllister, P., et al., "Ni-Catalyzed Carbon Infiltration of Carbon-Fiber Substrates," Carbon, vol. 30, No. 2, Jan. 1992, XP024357130, pp. 189-200.
First Office Action as issued in Chinese Patent Application No. 202180053380.3, dated Aug. 29, 2023.

* cited by examiner

*Primary Examiner* — Stuart L Hendrickson
(74) *Attorney, Agent, or Firm* — Pillsbury Winthrop Shaw Pittman LLP

(57) ABSTRACT

A method for recycling a carbonaceous by-product obtained during the manufacture of a part made of carbon/carbon composite material including pyrolysis of the carbonaceous by-product so as to obtain a carbonaceous residue; forming a gas phase comprising a hydrocarbon from the carbonaceous residue; separating the hydrocarbon from the remainder of the gas phase; introducing the hydrocarbon separated in this way into a reaction chamber, and forming pyrolytic carbon in the reaction chamber from the hydrocarbon introduced by infiltration or chemical vapor deposition.

8 Claims, 1 Drawing Sheet

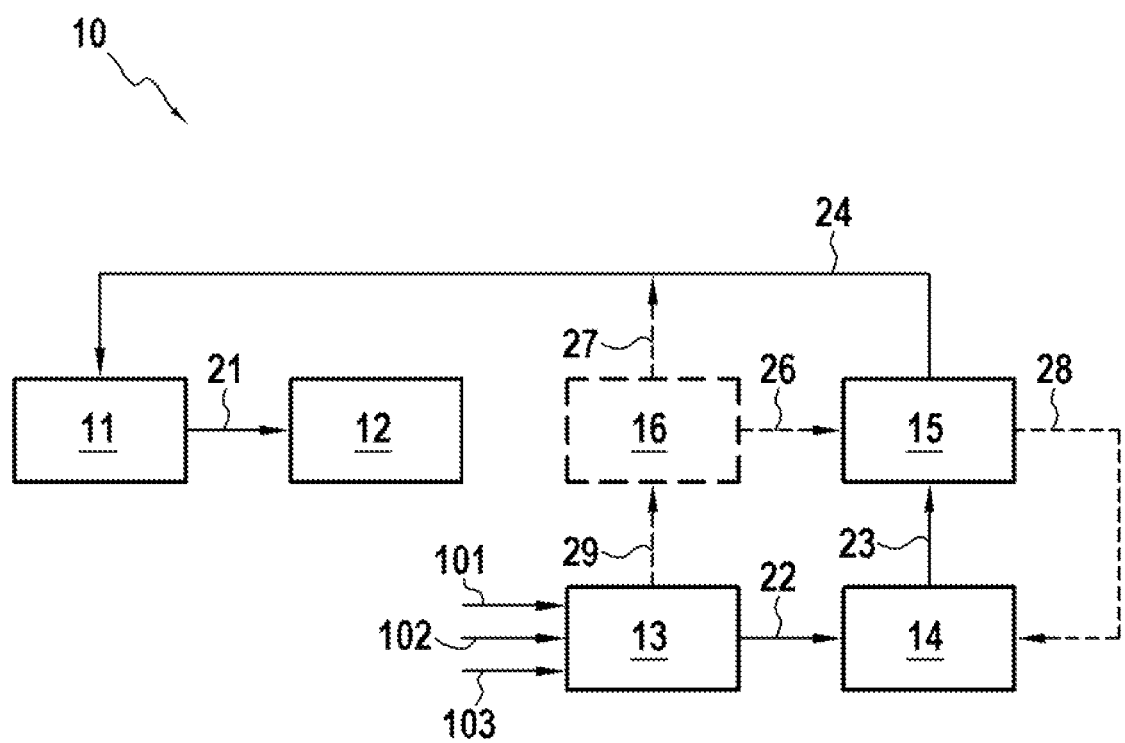

METHOD FOR RECYCLING CARBONACEOUS BY-PRODUCTS

CROSS-REFERENCE TO RELATED APPLICATIONS

This application is the U.S. National Stage of PCT/FR2021/051354, filed Jul. 20, 2021, which in turn claims priority to French patent application number 20 08126 filed Jul. 30, 2020. The content of these applications are incorporated herein by reference in their entireties.

TECHNICAL FIELD

The invention relates to the field of methods for preparing parts made of carbon/carbon composite material, and more specifically the recycling of by-products generated during such methods.

PRIOR ART

Parts made of carbon/pyrolytic carbon material are experiencing a growing technological interest due to the good compromise they offer in terms of resistance and weight.

It is known to obtain parts made of carbon/pyrolytic carbon material by chemical infiltration or by chemical vapor deposition. Such methods use a reactive carbon-rich gas phase contacted with porous substrates under conditions such that the gas phase can react upon contact with the substrate to form a matrix in the porosities of the substrates. The choice of gas constituting the gas phase and the temperature and pressure conditions prevailing in the furnace determine the nature of the matrix formed within the composite material parts.

However, such methods generate carbonaceous by-products to reach a final part. These by-products are generally not recovered in current methods for preparing composite material parts. The recovery of these carbonaceous by-products would reduce the costs as well as the ecological footprint of the preparation methods and therefore of the parts obtained.

It is desirable to recycle the carbonaceous by-products obtained during the manufacture of a part made of carbon/carbon composite material.

DISCLOSURE OF THE INVENTION

The invention proposes a method for recycling a carbonaceous by-product obtained during the manufacture of a part made of carbon/carbon composite material comprising:
  pyrolysis of the carbonaceous by-product so as to obtain a solid carbonaceous residue;
  forming a gas phase comprising a hydrocarbon from the carbonaceous residue;
  separating the hydrocarbon from the remainder of the gas phase;
  introducing the hydrocarbon separated in this way into a reaction chamber; and
  forming pyrolytic carbon in the reaction chamber from the hydrocarbon introduced by infiltration or chemical vapor deposition.

The by-product is a product of any step in the method for preparing the composite material part that does not end up in the final part. This is waste from this preparation method.

Such a method allows to recover at least one carbonaceous by-product obtained during the manufacture of a composite material part. Thus, the carbon balance of the entire cycle is greatly improved, and its cost is also reduced, since part of the reagents necessary for the formation of pyrolytic carbon in the reaction chamber comes from the recycling of the by-product.

In one embodiment, the carbonaceous by-product comprises: a polycyclic aromatic hydrocarbon, a by-product from a textile operation for manufacturing a fibrous reinforcement of the composite material part, a by-product from the machining of a blank of the composite material part, or several of these by-products.

In a method for preparing a composite material part, a fibrous preform of the part is generally prepared, the preform then being densified by an infiltration or chemical vapor deposition step. The preparation of the fiber preform may comprise one or more textile operation(s), in particular weaving and/or needling steps. Such textile operations can generate scrap carbon fibers which constitute a recyclable by-product by implementing the invention.

Similarly, the infiltration or chemical vapor deposition method is carried out using a reactive gas phase introduced into a reaction chamber, where preforms of composite material parts are present. The pressure and temperature conditions prevailing in the furnace are adapted so that the reactive gas phase forms, by reaction within the porosities of the preform, a carbon matrix. However, it is generally observed that the effluent gas phase recovered at the outlet of the reaction chamber after passing through the porosities of the preform comprises species of the initial reactive phase which have not reacted and polycyclic aromatic hydrocarbons resulting from parasitic reactions such as naphthalene, pyrene, anthracene, acenaphthylene. The polycyclic aromatic hydrocarbons condense in the form of tars when the effluent gas cools, these tars constitute a recyclable by-product by implementing the invention.

At the end of the preform densification method, a blank of the part can also be subjected to a final machining step, in particular to give it the exact desired dimensions. Such a final machining step generates material scrap which can also be recycled by implementing the invention.

Several techniques are possible to form the gas phase from the carbonaceous residue, but it is preferred that the formation of the gas phase comprises:
  an oxidation of the carbonaceous residue so as to obtain a gas carbon oxide; and
  a hydrogenation of the carbon oxide obtained so as to form the gas phase comprising the hydrocarbon.

Such a two-step decomposition of the formation of the gas phase allows to use less restrictive pressure and temperature conditions industrially compared to direct hydrogasification of the carbonaceous residue.

The oxidation of the carbonaceous residue can be carried out by a gasification method in the presence of water vapor. This technique being known per se. Carbon oxide can be carbon monoxide and/or carbon dioxide.

The oxidation of the carbonaceous residue can be carried out at a temperature comprised between 1000° C. and 1500° C. and at a pressure comprised between 5 bar and 35 bar.

In the embodiment described above, the hydrogenation of carbon oxide can be carried out by reacting the carbon oxide produced during the oxidation of the carbonaceous residue with dihydrogen.

The hydrogenation can be carried out at a temperature comprised between 250° C. and 500° C. and at a pressure comprised between 1 bar and 10 bar.

In one embodiment, the hydrocarbon comprises a saturated linear hydrocarbon having 1 to 4 carbon atoms, for example methane, ethane, propane or a mixture of these compounds.

In particular, water is formed during hydrogenation, the water formed being then separated from the hydrocarbon then used to oxidize the carbonaceous residue. Such an embodiment allows to further reduce the costs of a method according to the invention since it reduces the quantity of reagents to be provided for the oxidation of the carbonaceous residue.

In another embodiment, the formation of the gas phase can be carried out in a single step by direct hydrogasification of the carbonaceous residue.

Regardless of the embodiment considered, several techniques known per se can be used to separate the hydrocarbon from the remainder of the gas phase. To achieve this separation, the gas phase can pass through a membrane allowing the hydrocarbon to pass selectively or a combination of washing the gas phase and condensation can be carried out in order to isolate the hydrocarbon. In the specific case of direct hydrogasification, cryogenic separation can be implemented.

In one embodiment, a gas stream is formed during the pyrolysis of the by-product, this gas stream comprising an additional hydrocarbon and dihydrogen, and the dihydrogen is separated from the remainder of the gas stream.

Such a step allows to recover the gases resulting from the pyrolysis of the carbonaceous by-product and thus to increase the number of species recovered at the end of the method.

In this embodiment, the dihydrogen separated in this way can be used in order to form the gas phase, for example to carry out the hydrogenation of the carbon oxide obtained by oxidation of the carbonaceous residue as described above.

Such an embodiment allows to further reduce the costs of the method since part of the dihydrogen useful for the step of forming the gas phase can be obtained directly from the gases resulting from the pyrolysis.

In one embodiment, the additional hydrocarbon separated from the dihydrogen is wholly or partly introduced into the reaction chamber to form the pyrolytic carbon in this chamber.

Such recycling allows to further improve the carbon balance of the recycling method since part of the reactive gas phase necessary for the formation of pyrolytic carbon in the reaction chamber is then obtained by the recycling of the gas stream generated during the pyrolysis of the carbonaceous product, thus reducing the necessary supply of reactive gas phase.

Such an embodiment may require an additional step of separating the additional hydrocarbon from the remainder of the gas stream, or else the separation of the additional hydrocarbon may be carried out jointly with the step of separating the dihydrogen. For example, such a separation can be carried out by membranes, by cryogenic distillation or by pressure swing adsorption methods (or PSA for the acronym "Pressure Swing Adsorber").

For example, the additional hydrocarbon can comprise a saturated linear hydrocarbon having from 1 to 4 carbon atoms, for example methane, ethane, propane, butane or a mixture of these compounds.

In one embodiment, when carrying out the method, the reaction chamber comprises a preform of a friction part to be obtained, and this preform is densified by the pyrolytic carbon formed by chemical vapor infiltration from the hydrocarbon introduced.

Such an embodiment allows, as indicated above, to obtain the densification of a friction part at lower cost since part of the necessary reagents is obtained via the recycling of the by-products of the manufacturing method.

BRIEF DESCRIPTION OF THE DRAWINGS

FIG. 1 schematically and partially illustrates steps of a method according to one embodiment of the invention.

DESCRIPTION OF EMBODIMENTS

The invention is now described by means of an exemplary embodiment having an illustrative purpose and should not be interpreted as limiting the invention.

A method 10 according to the invention is shown schematically in FIG. 1.

The optional steps in the considered example of method 10 are dotted.

Carbonaceous by-products (101, 102, 103) from different steps of a method for manufacturing a part made of carbon/carbon composite material are introduced into a pyrolysis chamber 13.

As mentioned above, these may for example be scraps of carbon fibers 101 obtained during textile operations carried out to obtain a fibrous preform of a part made of carbon/carbon composite material, polycyclic aromatic hydrocarbons 102 obtained at the outlet of a reaction chamber 12 for manufacturing a part made of carbon/carbon composite material, or else of machining scraps of a part made of carbon/carbon composite material 103 obtained during the final machining of a blank of composite material part.

In one embodiment, the stream 102 may comprise one or more washing oils optionally used to trap the polyaromatic hydrocarbons at the outlet of the reaction chamber 12. In another embodiment, the polyaromatic hydrocarbons are separated from such oils before being introduced into the pyrolysis chamber 13.

It is not necessary for the purposes of the invention to have a plurality of carbonaceous by-products 101, 102, 103, and the operation presented here with a plurality of carbonaceous by-products 101, 102, 103 remains similar in the case where only one of the carbonaceous by-products 101, 102, 103 is used.

The pyrolysis of the carbonaceous by-products is then carried out in the pyrolysis enclosure 13. This pyrolysis produces a solid carbonaceous pyrolysis residue 22 as well as a gas pyrolysis stream 29.

The carbonaceous pyrolysis residue 22 can undergo oxidation 14, for example by being placed in the presence of water, for example in the form of water vapor.

This oxidation can be a gasification resulting in the formation of carbon monoxide, that is to say a chemical reaction of hydro-oxidation of carbon the balance of which can be written: $C+H_2O \leftrightarrow CO+H_2$, and possibly to the formation of carbon dioxide produced by the following equilibrium reaction: $2\ CO \leftrightarrow C+CO_2$. The oxidation of the carbonaceous pyrolysis residue 22 allows to obtain a carbon oxide 23, for example carbon monoxide and/or carbon dioxide. Carbon oxide 23 then undergoes hydrogenation 15 to form at least one hydrocarbon 24.

In one embodiment, hydrogenation allows to form methane, for example via a chemical reaction the balance of which can be written: $CO+3H_2 \leftrightarrow CH_4+H_2O$ [reaction 1], and possibly a reaction the balance of which can be written: $CO_2+4H_2 \leftrightarrow CH_4+2\ H_2O$ [reaction 2] due to the balance between CO and $CO_2$ described above.

In one embodiment, a catalyst, for example a nickel catalyst, may be present to catalyze the first [reaction 1] and/or the second reaction [reaction 2], and thus further increase the rate of formation of the hydrocarbon 24.

The water 28 produced during hydrogenation 15 can be recovered by condensation.

As indicated above, the step of separating the hydrocarbon from the remainder of the gas phase can be carried out by washing and condensation or using one or more selective membranes.

In one embodiment, the hydrocarbon 24 in the gas state is added to a reactive gas phase 11, which is introduced 21 into a reaction chamber.

In one embodiment not shown in FIG. 1, the polycyclic aromatic hydrocarbons 102 obtained at the outlet of the reaction chamber 12 can be introduced into the pyrolysis chamber 13, if necessary after an additional separation step not shown to isolate them from the gas stream obtained at the outlet of the reaction chamber 12.

Such an embodiment allows continuous recycling of the polycyclic aromatic hydrocarbons 102 obtained at the outlet of the densification chamber, and their recovery by means of all the steps of pyrolysis 13, obtaining 14 of a carbon oxide 23, and hydrogenation 15 of the carbon oxide obtained 23.

As indicated above, in an embodiment not shown, direct hydrogasification can be carried out to form the gas phase and obtain the hydrocarbon.

In one embodiment and optionally, the gas stream generated during the pyrolysis 29 can undergo a separation 16 so as to separate the dihydrogen 26 from the remainder of the gas stream 29. The dihydrogen 26 separated in this way can then be used during the hydrogenation step 15 of the carbon oxide 23.

If necessary, dihydrogen 26 can also be used if direct hydrogasification of the carbonaceous residue is carried out. For example, such a hydrogasification step can be carried out at around 50 bar and around 1000° C.

In one embodiment, the step 16 of separating the components of the pyrolysis gas stream 29 can also allow separation of an additional hydrocarbon 27, which can be mixed with the hydrocarbon 24 in the reactive phase 11.

In one embodiment, the additional hydrocarbon 27 may be identical to the hydrocarbon 24, or, in the case where several hydrocarbons 24 are obtained, identical to one of these hydrocarbons 24 or different.

Optionally, as shown in FIG. 1, the water 28 created during the hydrogenation 15 of the carbon oxide 23 can be used for the oxidation step 14 of the pyrolysis residue 22.

The method 10 allows to obtain at least one hydrocarbon 24 via the recovery of carbonaceous by-products. Thus, the economic cost of the method for manufacturing 10 a part made of carbon/carbon material is reduced, and the carbon balance of such a method is therefore improved.

The invention claimed is:

1. A method for recycling a carbonaceous waste product obtained during the manufacture of a part made of carbon/carbon composite material comprising:
   pyrolysis of the carbonaceous waste product so as to obtain a solid carbonaceous residue;
   forming a gas phase comprising a hydrocarbon from the solid carbonaceous residue;
   separating the hydrocarbon from the remainder of the gas phase;
   introducing the hydrocarbon separated in this way into a reaction chamber, and forming pyrolytic carbon in the reaction chamber from the hydrocarbon introduced by infiltration or chemical vapor deposition.

2. The recycling method according to claim 1, wherein the carbonaceous waste product comprises: a polycyclic aromatic hydrocarbon, a waste product from manufacturing a fibrous reinforcement of the composite material part by weaving or needling or both, a waste product from the machining of a blank of the composite material part, or several of these waste products.

3. The recycling method according to claim 1, wherein the formation of the gas phase comprises:
   an oxidation of the carbonaceous residue so as to obtain a gas carbon oxide, and
   a hydrogenation of the carbon oxide obtained so as to form the gas phase comprising the hydrocarbon.

4. The recycling method according to claim 3, wherein water is formed during hydrogenation, the water formed being then separated from the hydrocarbon then used to oxidize the carbonaceous residue.

5. The recycling method according to claim 1, wherein a gas stream is formed during the pyrolysis of the waste product, said gas stream comprising an additional hydrocarbon and dihydrogen, and wherein the dihydrogen is separated from the remainder of the gas stream.

6. The recycling method according to claim 5, wherein the dihydrogen separated is used in order to form the gas phase.

7. The method according to claim 5, wherein the additional hydrocarbon separated from the dihydrogen is wholly or partly introduced into the reaction chamber to form the pyrolytic carbon in this chamber.

8. The method according to claim 1, wherein the reaction chamber comprises a preform of a friction part to be obtained, and wherein said preform is densified by the pyrolytic carbon formed by chemical vapor infiltration from the hydrocarbon introduced.

* * * * *